A. L. HARRELL.
BOLT AND LOCK NUT.
APPLICATION FILED JUNE 12, 1918.
1,289,165.
Patented Dec. 31, 1918.
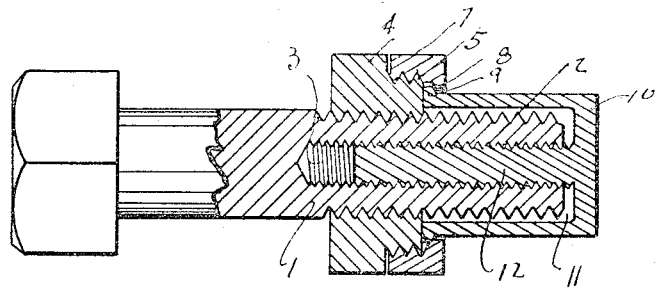
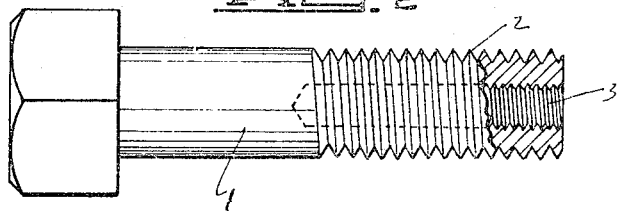
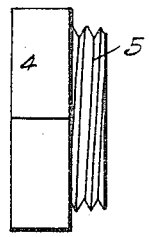
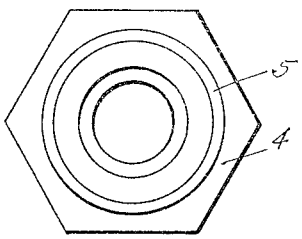
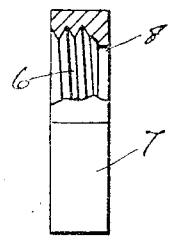
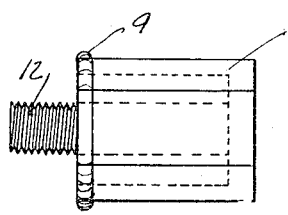
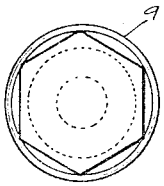
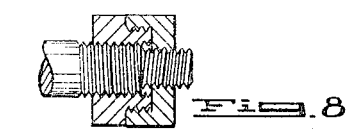
INVENTOR
*ANNIE L. HARRELL*
BY
ATTORNEY

UNITED STATES PATENT OFFICE.

ANNIE L. HARRELL, OF ELLENSBURG, WASHINGTON.

BOLT AND LOCK-NUT.

1,289,165.   Specification of Letters Patent.   Patented Dec. 31, 1918.

Application filed June 12, 1918. Serial No. 239,620.

*To all whom it may concern:*

Be it known that I, ANNIE L. HARRELL, citizen of the United States, residing at Ellensburg, in the county of Kittitas and State of Washington, have invented certain new and useful Improvements in Bolts and Lock-Nuts, of which the following is a specification.

This invention relates to improvements in bolts and lock nuts and has for its principal object to provide an improved and novel bolt and lock nut construction in which means is provided whereby a larger amount of adjustment is possible than is usual in this particular type of bolt and lock nut; to provide a bolt and lock nut construction in which the end of the bolt is inclosed in a protective cap to prevent injury to the threads.

Other objects will appear as my invention is more fully explained in the following specification, illustrated in the accompanying drawings and pointed out in the appended claims.

In the drawings Figure 1 is a longitudinal section of my bolt and nut in assembled position. Fig. 2 is a side elevation of the bolt alone with parts broken away. Fig. 3 is a side elevation of one member of the lock nut. Fig. 4 is an end elevation of Fig. 3. Fig. 5 is a side elevation of the other member of the nut with parts broken away. Fig. 6 is a side elevation of the bolt cap. Fig. 7 is an end elevation of Fig. 6. Fig. 8 is a longitudinal section of an alternate form of bolt and lock nut construction.

Referring more particularly to the drawings numeral 1 indicates a bolt which has external threads 2 and which is bored out centrally and internally threaded as at 3. A male nut member 4 is internally threaded to screw over bolt threads 2 and is provided with external threads 5 which are engaged by the internally threaded portion 6 of a female nut member 7 the latter having an internal annular shoulder 8 which coöperates with a similar shoulder 9 on a nut housing 10 the outer portion of which is hexagonal. The nut housing is cored out as at 11 and has an externally threaded stem 12 which projects beyond its inner or open end and which fits into the internally threaded portion 3 of bolt 1. It will be understood that the external threads on the bolt and the internal threads on the nut member 4 are right handed and that all other threads are left handed. Because of the peculiar arrangement of the cap 10 and its stem 12 it will be apparent that the lock nut has a wide range of adjustment as the cap has the same amount of movement as the nuts.

In operation when the nut member 4 has been brought up against an object the cap is screwed up against it and the nut member 7 screwed on to the nut member 4 as shown in Fig. 1. Because of the left handed threads of the stem 12, the cap 10 and the nut member 7 it will be apparent that any movement of nut 4 to loosen it will lock all of the other members and itself against further movement.

While I have shown a particular form of embodiment of my invention I am aware that many minor changes therein will readily suggest themselves to others skilled in the art without departing from the spirit and scope of the appended claims, and I therefore desire to avoid being limited to the exact form shown and described.

Having described my invention, what I claim as new and desire to protect by Letters Patent, is:—

1. In a device of the class described the combination of an internally and externally threaded bolt, an internally and externally threaded nut the inner threads of which coöperate with the external threads of the bolt, a shouldered cap fitting slidably over said bolt, a threaded stem extending throughout the length of said cap and integral therewith, the said threaded stem screwed into the said internal threads of the said bolt, and a flanged nut fitted over the cap, the flange of the nut engaging the shoulder of the cap, the flanged nut having internal threads which engage the external threads on the first mentioned nut to lock the parts together.

2. An externally and right handedly threaded bolt, a left handedly threaded hole extending centrally of the said bolt, a right handed and internally threaded nut secured on to the said bolt, left handed external threads on said nut, a hollow and shouldered cap slidably fitted over said bolt, a shouldered and internally and left handedly threaded female nut member revolubly mounted on said cap with its shouldered portion coöperating with the shoulder on said cap and its threaded portion coöperating with the external threads of the first mentioned nut member.

In testimony whereof I affix my signature in the presence of two witnesses.

ANNIE L. HARRELL.

Witnesses:
MARGUERITE LEYDA,
GENEVA ELDER.

Copies of this patent may be obtained for five cents each, by addressing the "Commissioner of Patents, Washington, D. C."